(12) United States Patent
Kaneko et al.

(10) Patent No.: US 9,776,661 B2
(45) Date of Patent: Oct. 3, 2017

(54) VEHICLE LOWER PORTION STRUCTURE

(71) Applicant: TOYOTA JIDOSHA KABUSHIKI KAISHA, Toyota-shi (JP)

(72) Inventors: Hayato Kaneko, Nagakute (JP); Hiroshi Mizuo, Toyota (JP); Toshiki Iwama, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/889,688

(22) PCT Filed: May 1, 2014

(86) PCT No.: PCT/JP2014/062540
§ 371 (c)(1),
(2) Date: Nov. 6, 2015

(87) PCT Pub. No.: WO2014/203646
PCT Pub. Date: Dec. 24, 2014

(65) Prior Publication Data
US 2016/0107694 A1    Apr. 21, 2016

(30) Foreign Application Priority Data

Jun. 20, 2013 (JP) .................................. 2013-129929

(51) Int. Cl.
*B62D 21/15* (2006.01)
*B62D 21/11* (2006.01)

(52) U.S. Cl.
CPC ............ *B62D 21/11* (2013.01); *B62D 21/155* (2013.01); *B60G 2204/15* (2013.01)

(58) Field of Classification Search
CPC ...... B62D 21/155; B62D 21/15; B62D 21/11; B60G 2204/15
See application file for complete search history.

(56) References Cited

U.S. PATENT DOCUMENTS

| 7,229,099 B2 * | 6/2007 | Reim ................... B62D 21/155 180/274 |
| 8,333,425 B2 * | 12/2012 | Yoshida ............... B62D 21/152 296/187.09 |

(Continued)

FOREIGN PATENT DOCUMENTS

| CN | 102161351 A | 8/2011 |
| JP | 2004-203274 A | 7/2004 |

(Continued)

OTHER PUBLICATIONS

International Search Report and Written Opinion issued on Sep. 23, 2014 for PCT/JP2014/062540 filed on May 1, 2014.

(Continued)

*Primary Examiner* — Paul N Dickson
*Assistant Examiner* — Timothy Wilhelm
(74) *Attorney, Agent, or Firm* — Oblon, McClelland, Maier & Neustadt, L.L.P.

(57) ABSTRACT

A vehicle lower portion structure includes a suspension member, an inclined portion, and a receiving portion. The suspension member is disposed at a lower portion of a space portion at a vehicle body front side of a vehicle cabin. The inclined portion is provided at a vehicle body structural member that is further toward a vehicle body rear side than a rear portion of the suspension member, and has an inclined surface that, when the suspension member moves toward a vehicle body rear side, guides the suspension member toward a vehicle body lower rear side. The receiving portion has a receiving surface that, when the suspension member moves toward a vehicle body obliquely rear side as seen in plan view, receives the suspension member.

8 Claims, 8 Drawing Sheets

(56) References Cited

U.S. PATENT DOCUMENTS

| | | | |
|---|---|---|---|
| 8,540,259 B1 * | 9/2013 | Young | B62D 21/155 |
| | | | 280/124.109 |
| 8,585,066 B2 * | 11/2013 | Young | B62D 21/155 |
| | | | 280/124.109 |
| 8,794,646 B1 * | 8/2014 | Onishi | B62D 21/155 |
| | | | 280/124.109 |
| 9,254,871 B2 * | 2/2016 | Hotta | B62D 21/155 |
| 2006/0113784 A1 | 6/2006 | Kishima | |
| 2011/0198832 A1 | 8/2011 | Takeshita et al. | |
| 2011/0198889 A1 | 8/2011 | Takeshita et al. | |
| 2012/0056447 A1 | 3/2012 | Yoshida | |

FOREIGN PATENT DOCUMENTS

| | | |
|---|---|---|
| JP | 2004-284427 A | 10/2004 |
| JP | 2013-049321 A | 3/2013 |
| WO | 2011/077554 A1 | 6/2011 |
| WO | 2012/001932 A1 | 1/2012 |

OTHER PUBLICATIONS

Office Action issued Aug. 1, 2016 in Chinese Patent Application No. 201480024615.6.

* cited by examiner

VEHICLE LOWER PORTION STRUCTURE

TECHNICAL FIELD

The present invention relates to a vehicle lower portion structure.

BACKGROUND ART

There is conventionally known a structure that is structured such that an inclined surface, that is inclined from a vehicle body upper front side toward a vehicle body lower rear side, is formed further toward the front side than a rear side mounting portion of a suspension member that is mounted to a front side member, and, when collision load is inputted from the vehicle body front side due to a full overlap crash, the rear side mounting portion is separated from the front side member while this inclined surface is guided by an inclined surface at the kick portion of the front side member (see, for example, Patent Document 1).

PRIOR ART DOCUMENTS

Patent Documents

[Patent Document 1] Japanese Patent Application Laid-Open (JP-A) No. 2004-284427

SUMMARY OF INVENTION

Technical Problem

However, there is still room for improvement in an energy absorbing structure that is structured by a suspension member, with respect to collision load that is inputted from a vehicle body obliquely front side as seen in plan view, such as in the case of an offset crash or a small overlap crash or the like.

Thus, an object of the present invention is to provide a vehicle lower portion structure that can efficiently absorb collision load that is inputted to a suspension member from the vehicle body front side or a vehicle body obliquely front side.

Solution to Problem

In order to achieve the above-described object, a vehicle lower portion structure relating to a first aspect of the present invention comprises: a suspension member that is disposed at a lower portion of a space portion at a vehicle body front side of a vehicle cabin; an inclined portion that is provided at a first vehicle body structural member that is further toward a vehicle body rear side than a rear portion of the suspension member, and that has an inclined face that, when the suspension member moves toward the vehicle body rear side, guides the suspension member toward a vehicle body lower rear side; and a receiving portion that is provided at a second vehicle body structural member that is further toward the vehicle body rear side than the rear portion of the suspension member, and that has a receiving face that, when the suspension member moves toward a vehicle body obliquely rear side as seen in plan view, receives the suspension member. The first vehicle body structural member at which the inclined portion is provided and the second vehicle body structural member at which the receiving portion is provided may be the same member or different members.

In accordance with the invention of the first aspect, an inclined portion that has an inclined surface that, when the suspension member moves toward the vehicle body rear side, guides the suspension member toward the vehicle body lower rear side, and a receiving portion that has a receiving surface that, when the suspension member moves toward a vehicle body obliquely rear side as seen in plan view, receives the suspension member, are provided at vehicle body structural members that are further toward the vehicle body rear side than the rear portion of the suspension member.

Accordingly, the suspension member, that moves toward the vehicle body rear side due to collision load inputted from the vehicle body front side, is moved along the inclined surface of the inclined portion so as to enter-in deeply toward the vehicle body lower rear side. Accordingly, the collision load, that is inputted to the suspension member from the vehicle front side, is absorbed efficiently.

Further, the suspension member, that moves toward a vehicle body obliquely rear side as seen in plan view due to collision load inputted from a vehicle body obliquely front side, is received by the receiving surface of the receiving portion, and this collision load is transmitted to the vehicle body structural member. Accordingly, collision load, that is inputted to the suspension member from a vehicle body obliquely front side, is absorbed efficiently.

Further, a vehicle lower portion structure of a second aspect of the present invention is the vehicle lower portion structure of the first aspect, wherein the receiving face is formed further toward a vehicle transverse direction inner side than the inclined portion.

In accordance with the invention of the second aspect, the receiving face is formed further toward the vehicle transverse direction inner side than the inclined portion. Accordingly, when the suspension member moves toward a vehicle body obliquely rear side as seen in plan view, this suspension member is received appropriately.

A vehicle lower portion structure of a third aspect of the present invention is the vehicle lower portion structure of the first or second aspect, wherein the receiving face is formed as a result of a portion of the inclined portion being crushed in conjunction with movement of the suspension member toward the vehicle body obliquely rear side as seen in plan view.

In accordance with the invention of the third aspect, the receiving surface is formed due to a portion of the inclined portion being crushed in conjunction with movement of the suspension member toward the vehicle body obliquely rear side as seen in plan view. Accordingly, when the suspension member moves toward the vehicle body obliquely rear side as seen in plan view, this suspension member is received appropriately.

A vehicle lower portion structure of a fourth aspect of the present invention is the vehicle lower portion structure of any one of the first through third aspects, wherein the receiving portion extends in a vehicle transverse direction so as to over a tunnel portion formed at a floor panel.

In accordance with the invention of the fourth aspect, the receiving portion extends in the vehicle transverse direction so as to over the tunnel portion that is formed at the floor panel. Accordingly, the rigidity of the vehicle body is improved, and the steering stability is improved.

A vehicle lower portion structure of a fifth aspect of the present invention is the vehicle lower portion structure of any one of the first through fourth aspects, wherein the first vehicle body structural member and the second vehicle body structural member are the same member.

A vehicle lower portion structure of a sixth aspect of the present invention is the vehicle lower portion structure of the fifth aspect, wherein the inclined portion and the receiving portion are molded integrally.

In accordance with the invention of the sixth aspect, the inclined portion and the receiving portion are molded integrally. Accordingly, as compared with a case in which the inclined portion and the receiving portion are structured by separate bodies, an increase in the number of parts and an increase in the manufacturing cost are suppressed or prevented.

Advantageous Effects of Invention

As described above, in accordance with the invention relating to the first aspect, collision load, that is inputted to a suspension member from the vehicle body front side or a vehicle body obliquely front side, can be absorbed efficiently.

In accordance with the invention relating to the second aspect, a suspension member, that moves toward the vehicle body obliquely rear side as seen in plan view, can be received appropriately.

In accordance with the third aspect of the present invention, a suspension member, that moves toward a vehicle body obliquely rear side as seen in plan view, can be received appropriately.

In accordance with the fourth aspect of the present invention, the rigidity of a vehicle body can be improved, and the steering stability can be improved.

In accordance with the fifth aspect of the present invention, the inclined portion and the receiving portion can be positioned easily.

In accordance with the sixth aspect of the present invention, an increase in the number of parts and an increase in manufacturing costs can be suppressed or prevented.

DESCRIPTION OF EMBODIMENTS

Embodiments relating to the present invention are described in detail hereinafter on the basis of the drawings. Note that, for convenience of explanation, arrow UP that is shown appropriately in the respective drawings is the vehicle body upward direction, arrow FR is the vehicle body frontward direction, and arrow OUT is the vehicle transverse direction outer side. Further, in the following description, when vertical, longitudinal and left-right directions are used, they mean the vertical of the vehicle body vertical direction, the longitudinal of the vehicle body longitudinal direction, and the left-right of the vehicle body left-right direction (the vehicle transverse direction) unless otherwise stated.

First Embodiment

Figure 1:
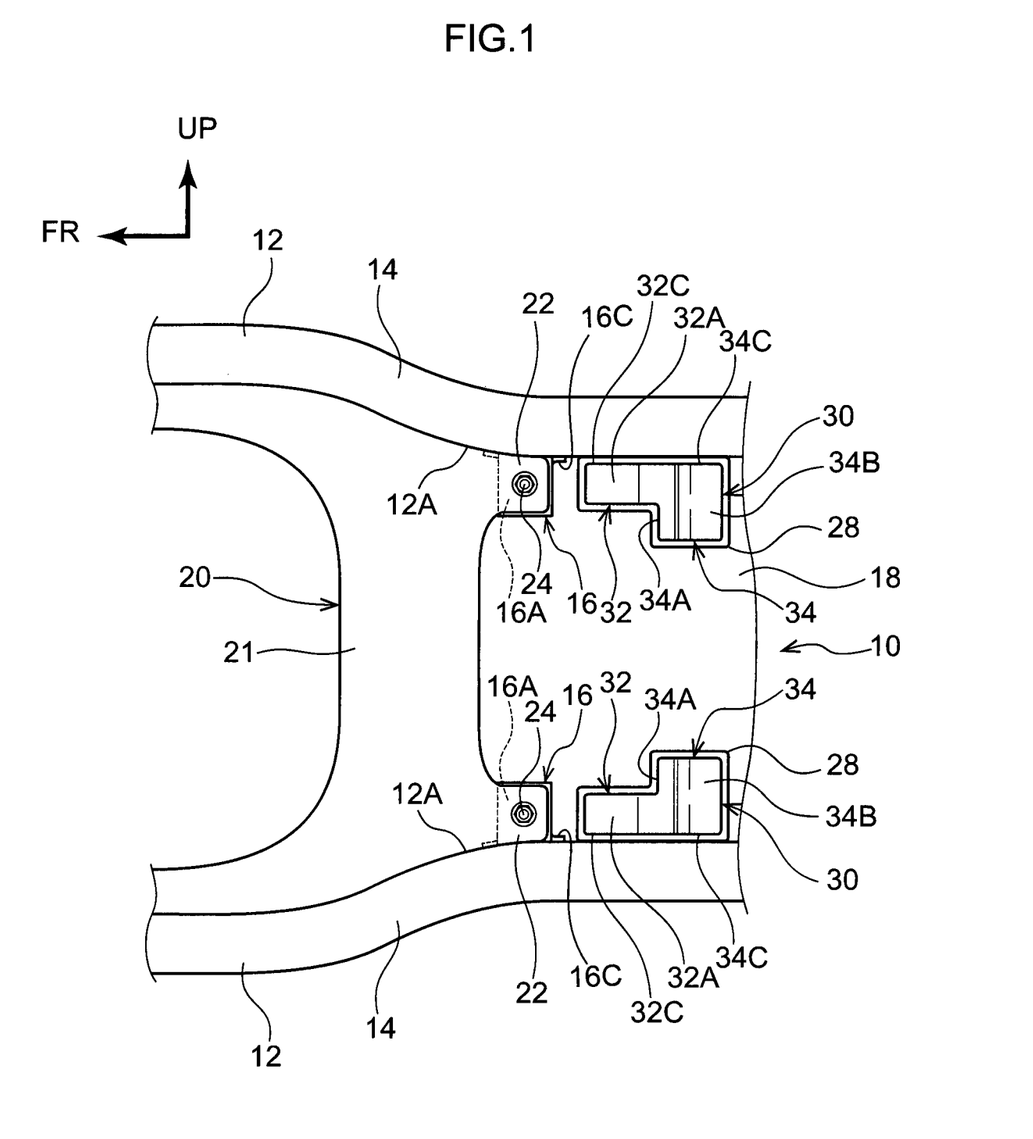
FIG. 1 is a bottom view showing a vehicle lower portion structure relating to a first embodiment.
Figure 2:
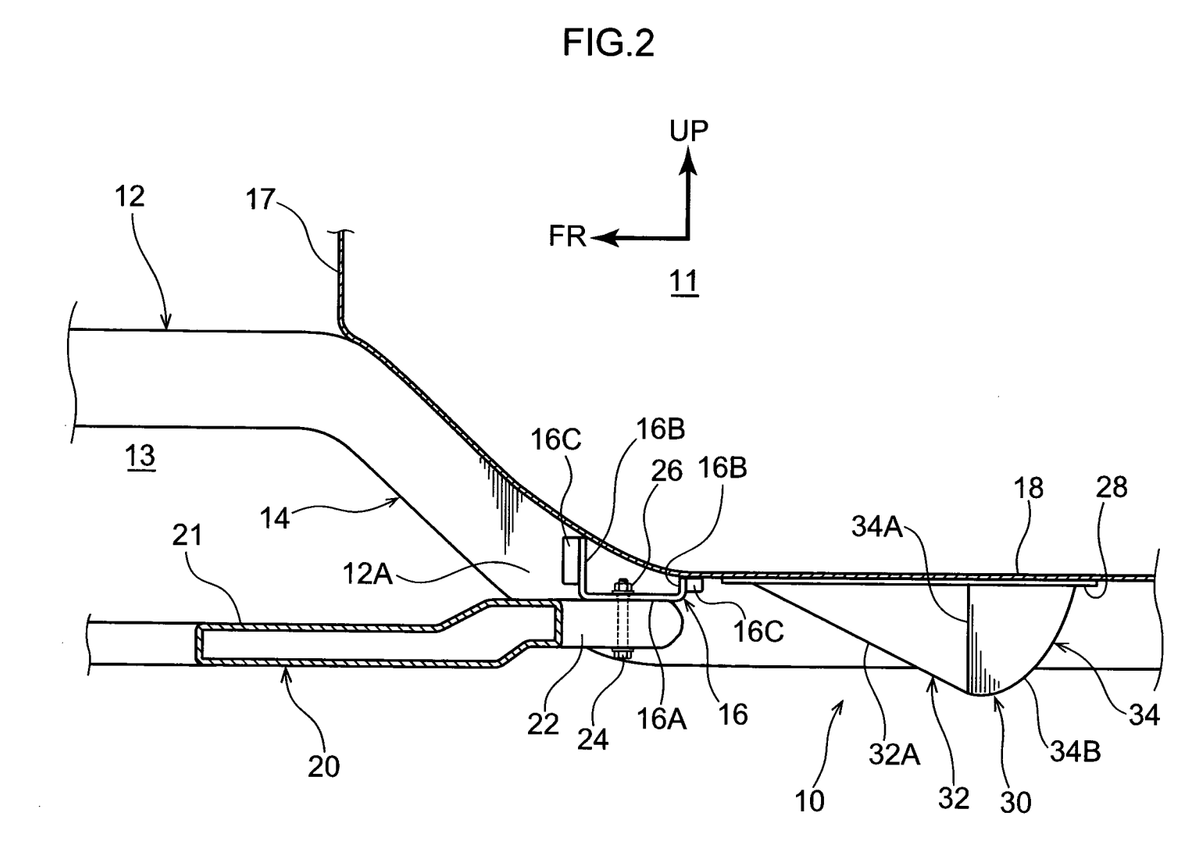
FIG. 2 is a side view showing the vehicle lower portion structure relating to the first embodiment.

First, a vehicle lower portion structure 10 relating to a first embodiment is described. As shown in FIG. 1 and FIG. 2, front side members 12, that have rectangular cross-sectional shapes and extend along the vehicle body longitudinal direction, are disposed as a left-right pair at the front portion side of the vehicle at the vehicle body right side and the vehicle body left side with a predetermined interval therebetween.

A kick portion (inclined portion) 14, that is for positioning the vehicle body front portion side at a higher position than the vehicle body rear portion side, is formed at each of the front side members 12. Further, a suspension member 20 that is made of metal is supported (disposed), in a state of hanging-down from the front side member 12, at the vehicle body lower front side of the kick portion 14, i.e., at the vehicle body lower side of the front side member 12 at the vehicle body front portion side that includes the kick portion 14 (the lower portion of an engine compartment room 13 that serves as a space portion at the vehicle body front side of a vehicle cabin 11).

In more detail, front side mounted-to portions (not illustrated), that are for mounting a pair of left and right front side mounting portions (not illustrated) of the suspension members 20 respectively, are provided at the front end portion sides of the respective front side members 12. Further, rear side mounted-to portions 16, that are for fastening and fixing a pair of left and right rear side mounting portions 22 of the suspension members 20 by bolts 24 and nuts 26 respectively, are provided at the lower end portions of the kick portions 14 of the respective front side members 12.

The rear side mounted-to portion 16 is formed in a hat-shape in cross-section that has a bottom wall 16A, that is a rectangular flat plate shape and that extends toward the vehicle transverse direction inner side, and a pair of side walls 16B. Flange portions 16C, that jut-out toward the vehicle body front side and the vehicle body rear side respectively, are formed integrally with the vehicle transverse direction outer side end portions of the respective side walls 16B. Namely, at each of the rear side mounted-to portions 16, the respective flange portions 16C are mounted, by being joined by welding or the like, to an inner side wall 12A of the front side member 12 at the lower end portion of the kick portion 14.

A through-hole (not illustrated) for the bolt 24 to be inserted therethrough is formed in the bottom wall 16A of each of the rear side mounted-to portions 16. The nut 26 is joined, coaxially with this through-hole, to the top surface of the bottom wall 16A. Further, the rear side mounting portions 22 of the suspension members 20 are formed so as to project-out, in substantially rectangular shapes as seen in bottom view, from the vehicle transverse direction both end portions of suspension member main bodies 21 toward the vehicle body rear side. The rear side mounting portions 22 have through-holes (not illustrated) that can communicate with the through-holes formed in the bottom walls 16A.

Accordingly, the rear side mounting portions 22 of the suspension members 20 are respectively mounted to the rear side mounted-to portions 16, that are fixed to the lower end portion inner sides (the inner side walls 12A) of the kick portions 14, due to the bolts 24 being inserted, from the vehicle body lower side, through the through-holes, that are formed in the rear side mounting portions 22 of the suspension members 20, and the through holes, that are formed in the bottom walls 16A of the rear side mounted-to portions 16, and being screwed-together with the nuts 26.

Further, due thereto, the rear side mounting portions 22, that are the vehicle body rear side end portions (rear portions) of the suspension members 20, are disposed further toward the vehicle transverse direction inner side than the front side members 12 (the kick portions 14). Note that the kick portions 14 are formed in hat shapes in cross-section, and structure closed cross-sectional shapes by being joined to the bottom surface of a floor panel 18 that is continuous from a dash panel 17. Further, an unillustrated power unit (engine and transmission) is disposed in the engine compartment room 13 at the vehicle body front side of the suspension members 20.

Figure 3:
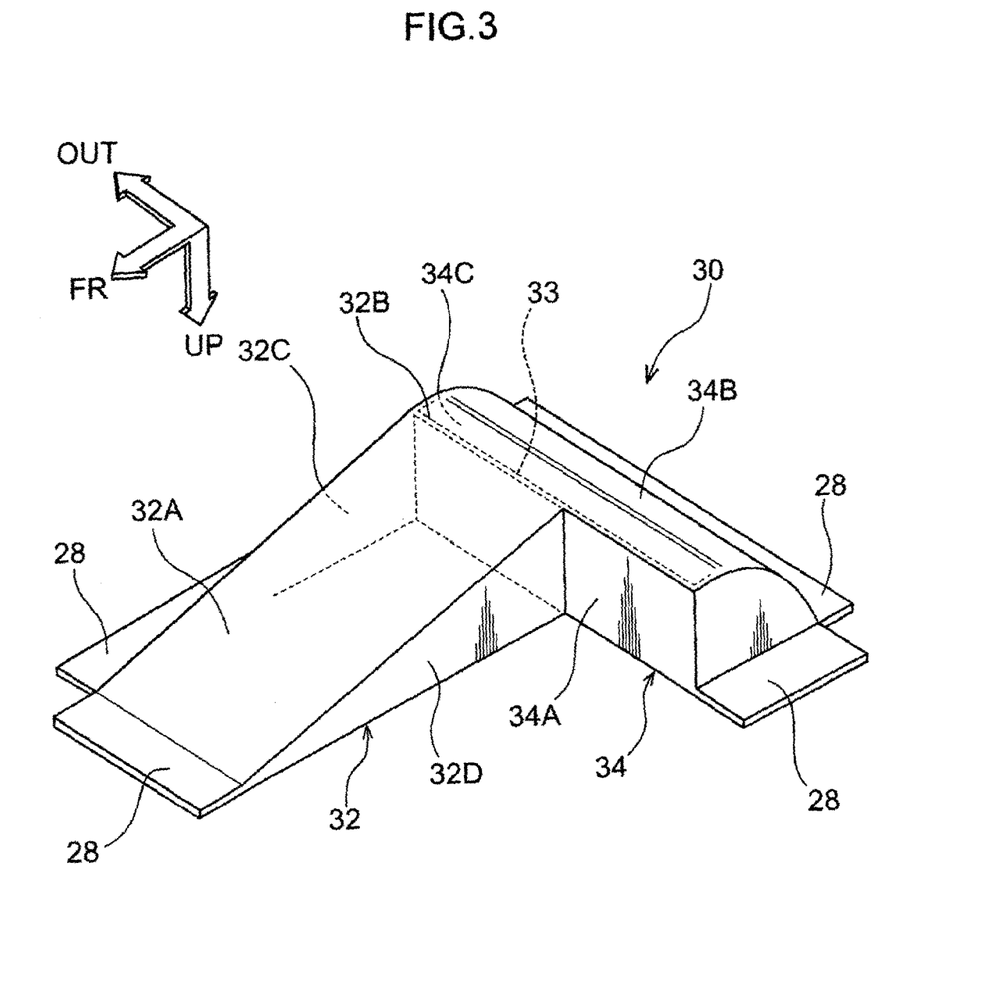
FIG. 3 is a perspective view showing an under member relating to the first embodiment.

Under members 30, that are formed in substantial "L"-shapes as seen in bottom view or plan view, are provided as a pair so as to have left-right symmetry at the bottom surface of portions of the floor panel 18 which portions are further toward the vehicle body rear side than the rear side mounting portions 22 (the rear side mounted-to portions 16). As shown in FIG. 1 through FIG. 3, at this under member 30, an inclined portion 32, that is columnar and whose side walls that face in the vehicle transverse direction are right triangular, and a receiving portion 34, that is columnar and whose side walls that face in the vehicle transverse direction are substantially fan-shaped (with a central angle of substantially 90°), are structured integrally.

Namely, the length direction of the inclined portion 32 is the vehicle body longitudinal direction (the inclined portion 32 extends in the vehicle body longitudinal direction), and the inclined portion 32 is provided integrally at the vehicle body front side of the receiving portion 34 and so as to be offset toward the vehicle transverse direction outer side. The width (the length in the vehicle transverse direction) of the inclined portion 32 is made to be substantially half of the width (the length in the vehicle transverse direction) of the receiving portion 34.

Further, the inclined portion 32 has an inclined surface 32A that faces the rear side mounting portion 22 in the vehicle body longitudinal direction and that is inclined at a predetermined angle toward the vehicle body lower rear side. The width (the length in the vehicle transverse direction) of this inclined surface 32A is substantially the same as the width (the length in the vehicle transverse direction) of the rear side mounting portion 22 of the suspension member 20. The rear side mounting portion 22, that moves toward the vehicle body rear side due to a full overlap crash, is guided toward the vehicle body lower rear side by this inclined surface 32A.

The receiving portion 34 is provided integrally with the vehicle body rear side of the inclined portion 32, and has a peripheral surface 34B that is continuous with the inclined surface 32A and is curved in a circular arc shape toward the vehicle body upper rear side as seen in side view. Further, this receiving portion 34 has a receiving surface 34A that is adjacent to the vehicle transverse direction inner side of the inclined portion 32 and is shaped as a rectangular planar surface that faces the vehicle body front side.

The width (the length in the vehicle transverse direction) of the receiving surface 34A is substantially the same as the width (the length in the vehicle transverse direction) of the inclined surface 32A. The height (the length in the vehicle body vertical direction, the radius of the substantial fan shape) of the receiving surface 34A is substantially the same as the height at a peak portion 32B of the inclined portion 32. The rear side mounting portion 22 of the suspension member 20, that moves toward a vehicle body obliquely rear side as seen in plan view due to an offset crash or a small overlap crash, is received by this receiving surface 34A.

Note that, as shown in FIG. 3, a flat plate portion 33 that structures the receiving surface 34A extends over the entire transverse direction of the receiving portion 34. Namely, the peak portion 32B of the inclined portion 32 is a structure that is supported by the flat plate portion 33. Further, an outer side wall 32C of the inclined portion 32 is integral with an outer side wall 34C of the receiving portion 34. An inner side wall 32D of the inclined portion 32 is integrally continuous with the receiving surface 34A (the flat plate portion 33) so as to form a substantial right angle with the receiving surface 34A as seen in a bottom view (plan view).

Moreover, flange portions 28, that jut-out toward the outer sides, are formed integrally with the peripheral edge portions (the upper end portions) of the inclined portion 32 and the receiving portion 34 (some of the flange portions 28 are omitted from FIG. 3). The under member 30 is mounted to the floor panel 18 due to these flange portions 28 being joined by welding or the like to the bottom surface of the floor panel 18.

Further, the under member 30 is molded integrally of a metal material that is harder than the suspension member 20, and the rigidity (strength) of the under member 30 is ensured. Note that the under member 30 may be integrally molded of a resin material that is harder than the suspension member 20, and, in such a case, the flange portions 28 are joined to the bottom surface of the floor panel 18 by an adhesive or the like. Further, the interior of the under member 30 shown in FIG. 3 is formed in a hollow shape that is partitioned by the flat plate portion 33, but at least the vehicle body rear side of the receiving surface 34A (the substantial half at the vehicle transverse direction inner side of the receiving portion 34) may be formed in a solid shape.

Further, it is preferable that the outer side walls 32C, 34C of the under member 30 are disposed so as to be adjacent to or so as to abut the inner side wall 12A, that faces the vehicle transverse direction inner side, of the front side member 12 at a portion thereof that is further toward the vehicle body rear side than the kick portion 14. In accordance therewith, at the time when the receiving surface 34A receives the rear side mounting portion 22 of the suspension member 20 that moves toward a vehicle body obliquely rear side due to an offset crash or a small overlap crash, the outer side walls 32C, 34C abut or pressure-contact the inner side wall 12A of the front side member 12, and therefore, the collision load that is inputted to the suspension member 20 can be efficiently transmitted to the front side member 12 as well.

Figure 4:
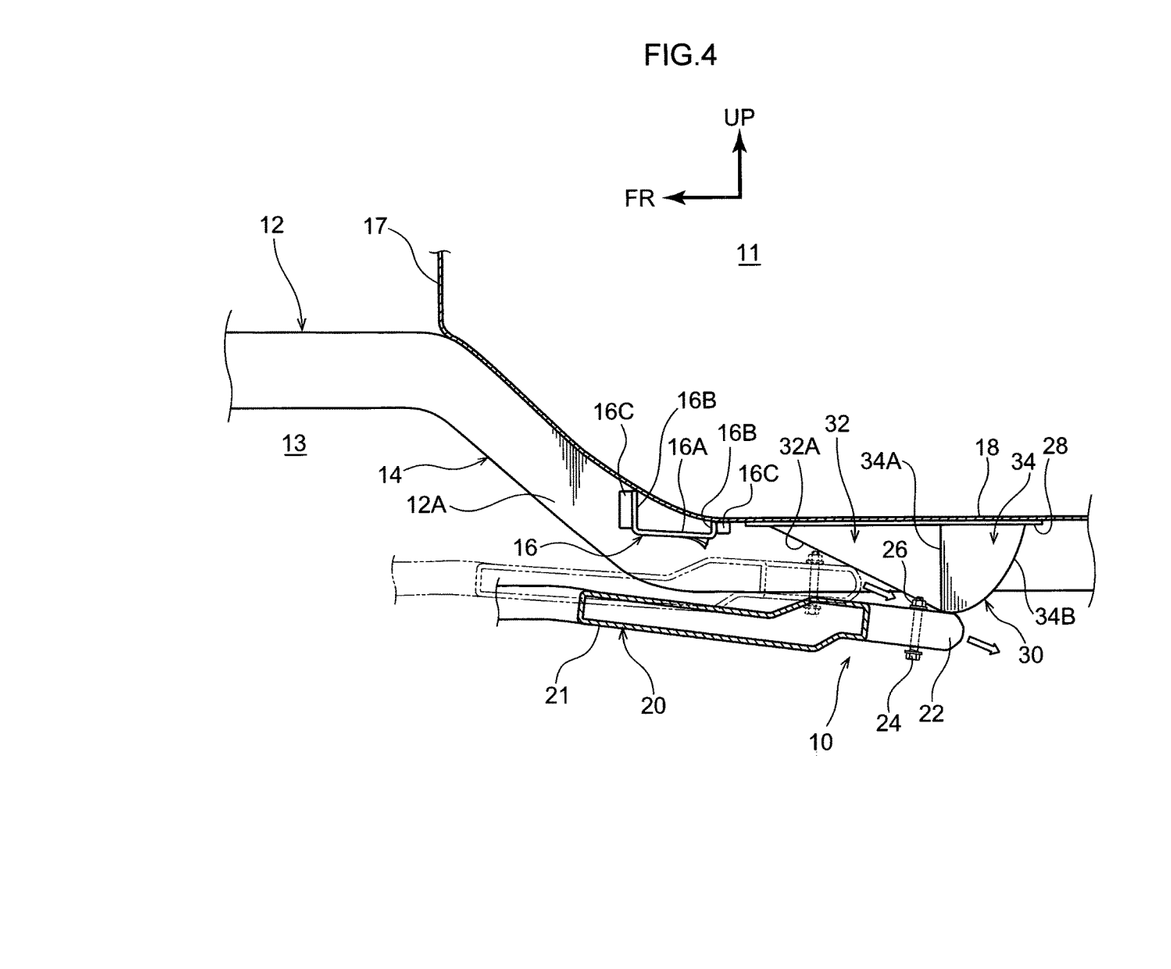
FIG. 4 is a side view showing a state, after a full overlap crash, of the vehicle lower portion structure relating to the first embodiment.
Figure 5:
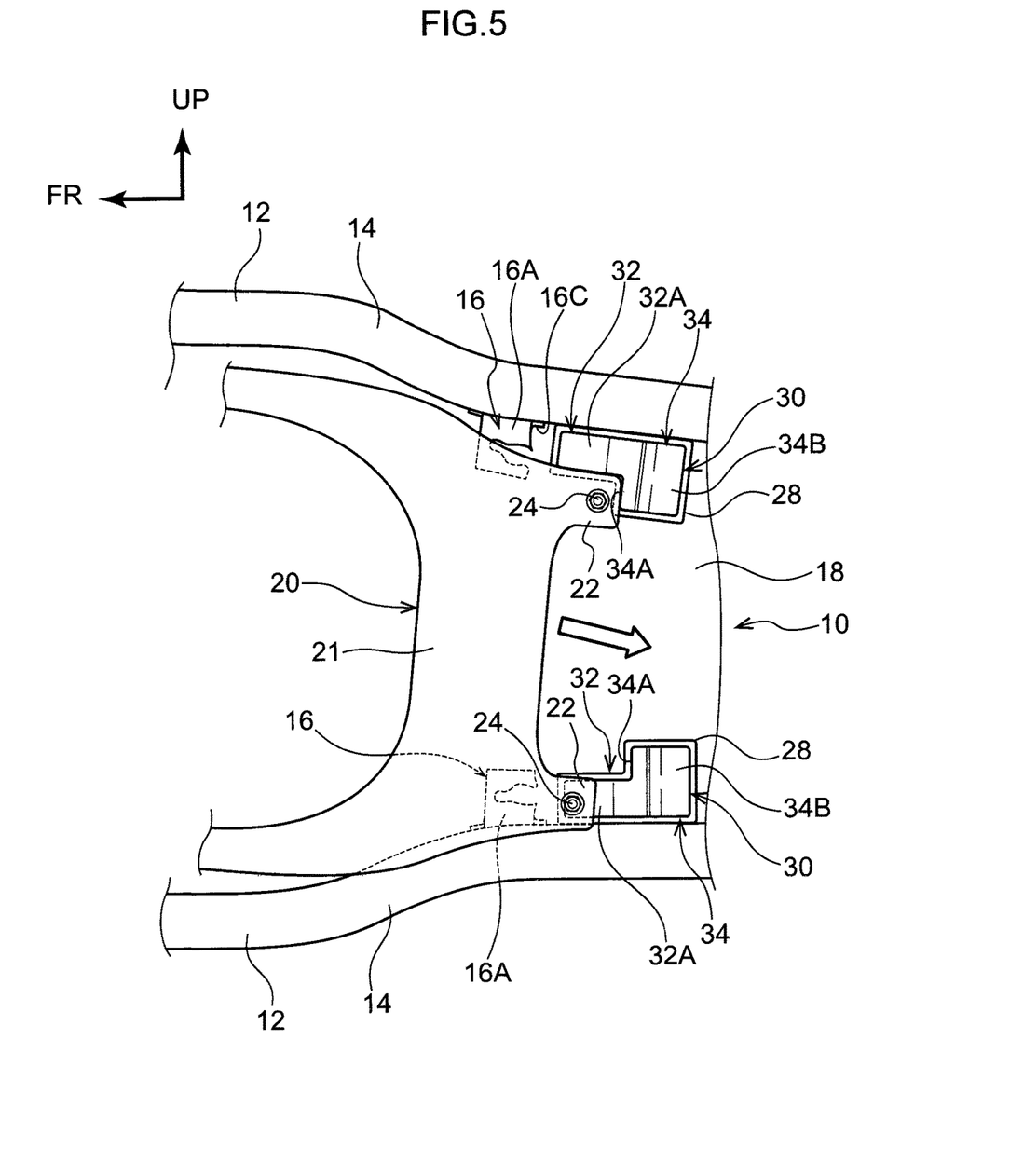
FIG. 5 is a bottom view showing a state, after an offset crash, of the vehicle lower portion structure relating to the first embodiment.

The operation of the vehicle lower portion structure 10 relating to the first embodiment, that has the above-described structure, is described next mainly on the basis of FIG. 4 and FIG. 5.

When the vehicle is in a full overlap (front) crash, the power unit moves toward the vehicle body rear side (moves rearward), and a portion of this collision load is inputted to the suspension members 20. Thereupon, as shown in FIG. 4, the respective rear side mounting portions 22 of the suspension members 20 separate from the respective rear side mounted-to portions 16.

In more detail, when collision load from the vehicle body front side is inputted to the suspension members 20, the respective rear side mounting portions 22 move toward the vehicle body rear side. Thereupon, the rear edge portions of the through-holes at the floor walls 16A of the respective rear side mounted-to portions 16 are pushed and broken by the respective bolts 24, and the respective rear side mounting portions 22 come apart from the respective rear side mounted-to portions 16.

When the respective rear side mounting portions 22 come apart from the respective rear side mounted-to portions 16, the suspension members 20 move straight toward the vehicle body rear side (move rearward), and the respective rear side mounting portions 22 are guided toward the vehicle body lower rear side while slidingly contacting the inclined surfaces 32A at the inclined portions 32 of the respective under members 30. Namely, movement of the suspension members 20 toward the vehicle body lower rear side is promoted.

Due thereto, the suspension members 20 are moved so as to enter-in deeply toward the vehicle body lower rear side, and the load transmission paths from the suspension members 20 to the vehicle cabin 11 can be eliminated. Therefore, the collision load that is inputted to the suspension members 20 can be let go (absorbed) efficiently. Accordingly, deformation of the vehicle cabin 11 can be suppressed or prevented.

On the other hand, when the vehicle is in an offset crash (or a small overlap crash), the power unit moves toward a vehicle body obliquely rear side as seen in plan view (moves rearward), and a portion of this collision load is inputted to the suspension members 20. Thereupon, as shown in FIG. 5, the respective rear side mounting portions 22 of the suspension members 20 are separated from the respective rear side mounted-to portions 16.

In more detail, when collision load from a vehicle body obliquely front side is inputted to the suspension members 20, the respective rear side mounting portions 22 move toward a vehicle body obliquely rear side as seen in plan view. Thereupon, the rear edge portions of the through-holes at the floor walls 16A of the respective rear side mounted-to portions 16 are pushed and broken by the respective bolts 24, and the respective rear side mounting portions 22 come apart from the respective rear side mounted-to portions 16.

When the respective rear side mounting portions 22 come apart from the respective rear side mounted-to portions 16, the suspension members 20 move (move rearward) while rotating toward a vehicle body obliquely rear side as seen in plan view, and the rear side mounting portion 22 at the collision side drops-out (or directly) from the inclined portion 32 of the under member 30 and is made to abut (pressure-contact) the receiving surface 34A at the receiving portion 34. Namely, the movement, toward a vehicle body obliquely rear side as seen in plan view, of the suspension member 20 is impeded by the receiving portion 34 (the receiving surface 34A).

Accordingly, the collision load that is inputted to the suspension member 20 is transmitted from the rear side mounting portion 22 to the under member 30, and is transmitted from the under member 30 to the floor panel 18, and further to the front side member 12. Namely, the transmission path of the collision load that is inputted to the suspension member 20 can be ensured (a reduction in the load transmission path can be suppressed), and this collision load can be absorbed efficiently. Accordingly, deformation of the vehicle cabin 11 can be suppressed or prevented.

Note that, at the under member 30, the inclined portion 32 and the receiving portion 34 are integrally molded of a metal material (or a resin material), but the inclined portion 32 and the receiving portion 34 may be structures that are respectively molded as separate bodies and joined together. Further, the configuration may be such that the inclined portion 32 and the receiving portion 34 are each provided at different vehicle body structural members. However, when the under member 30 is molded integrally, an increase in the number of parts (an increase in the number of manufacturing processes) and an increase in the manufacturing cost at the time of manufacturing the under member 30 can be suppressed or prevented.

Second Embodiment

The vehicle lower portion structure 10 relating to a second embodiment is described next. Note that regions that are equivalent to those of the above-described first embodiment are denoted by the same reference numerals, and detailed description thereof (including common operation thereof) is omitted when appropriate.

Figure 6:
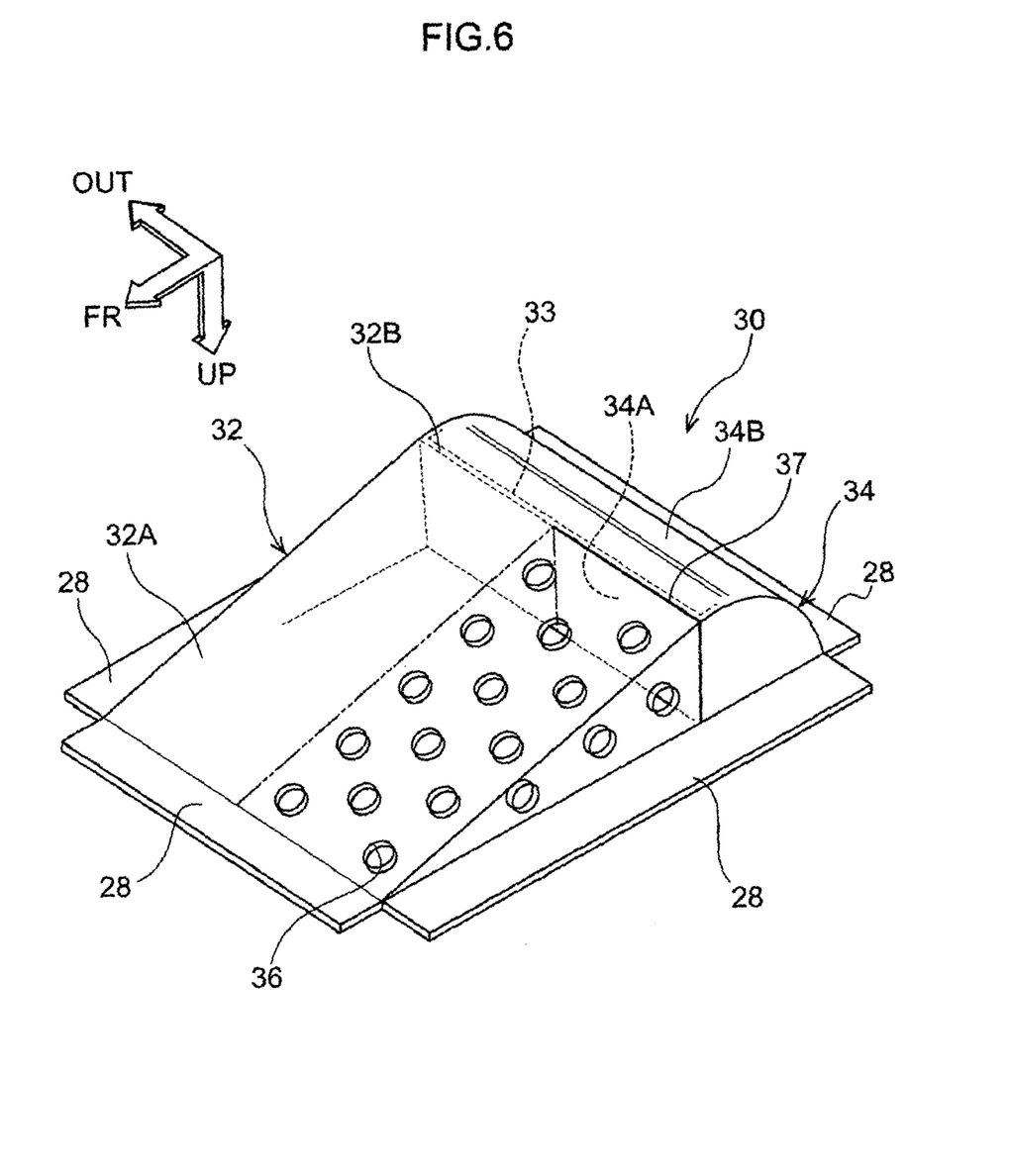
FIG. 6 is a perspective view showing an under member relating to a second embodiment.

As shown in FIG. 6, in the vehicle lower portion structure 10 relating to this second embodiment, the shape of the under member 30 is different than in the above-described first embodiment. Namely, the under member 30 relating to the second embodiment has the inclined portion 32 that is formed over the entire transverse direction of the receiving portion 34.

Numerous (plural) through-holes 36 that are circular for example are formed in the region that is the substantial half at the vehicle transverse direction inner side of this inclined portion 32, and there is a structure in which the rigidity of the substantial half at the vehicle transverse direction inner side, except for the receiving portion 34, of the under member 30 is reduced. Note that discontinuous slits or a groove portion 37 or the like, that serve as a breakage facilitating means, may be formed in the peak portion 32B at the region of the substantial half at the vehicle transverse direction inner side of the inclined portion 32.

In accordance with the under member 30 that has such a structure, when the vehicle is in an offset crash (or a small overlap crash), as the suspension members 20 move (move rearward) while rotating toward a vehicle body obliquely rear side in plan view, the rear side mounting portion 22 at the collision side crushes the substantial half at the vehicle transverse direction inner side of the inclined portion 32 of the under member 30 at the collision side, i.e., the region in which the through-holes 36 are formed. Due thereto, the region in which the through-holes 36 are formed of the inclined portion 32 breaks and caves-in from the peak portion 32B, and the receiving surface 34A (the flat plate portion 33) of the receiving portion 34 is exposed.

Namely, the rear side mounting portion 22 at the collision side is made to abut (pressure-contact) the exposed receiving surface 34A, and movement of the suspension member 20 toward a vehicle body obliquely rear side in plan view is impeded by this receiving surface 34A. Accordingly, the collision load that is inputted to the suspension member 20 is transmitted from the rear side mounting portion 22 to the under member 30, and is transmitted from the under member 30 to the floor panel 18, and further to the front side member 12.

In this way, at the under member 30 relating to the second embodiment as well, the transmission path of the collision load that is inputted to the suspension member 20 can be ensured (a reduction in the load transmission path can be suppressed), and this collision load can be absorbed efficiently. Accordingly, deformation of the vehicle cabin 11 can be suppressed or prevented.

Note that the receiving surface 34A may be structured, without providing the flat plate portion 33, by the substantial half at the vehicle transverse direction inner side of the inclined portion 32 that is crushed, i.e., by a portion of the peak portion 32B side of the region where the through-holes 36 are formed. Further, when the vehicle is in a full overlap crash, operation is equivalent to that of the above-described first embodiment, and therefore, description thereof is omitted.

Third Embodiment

The vehicle lower portion structure 10 relating to a third embodiment is described next. Note that regions that are equivalent to those of the above-described first embodiment and second embodiment are denoted by the same reference numerals, and detailed description thereof (including common operation thereof) is omitted when appropriate.

Figure 7:
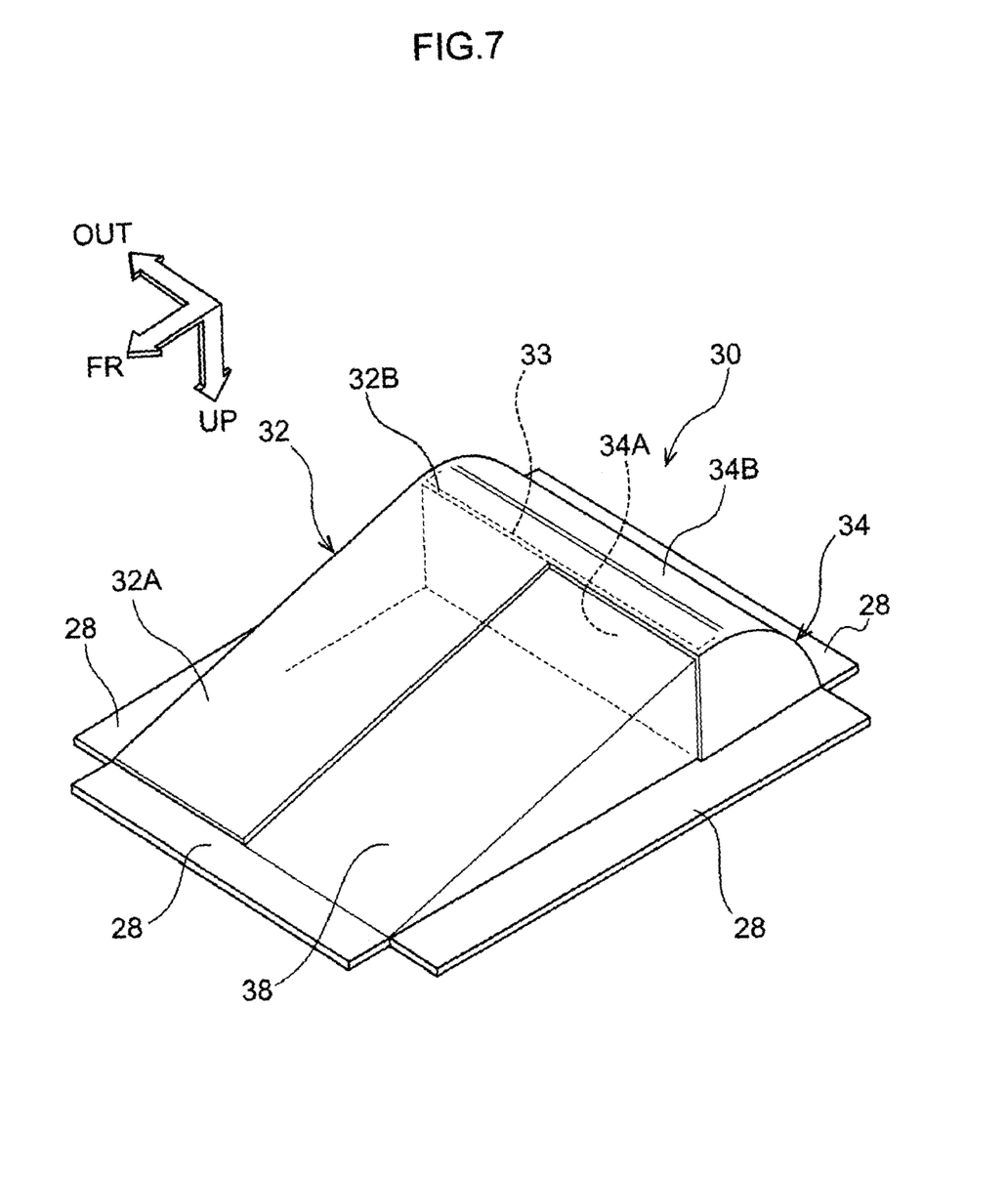
FIG. 7 is a perspective view showing an under member relating to a third embodiment.

As shown in FIG. 7, in the vehicle lower portion structure 10 relating to this third embodiment, the shape of the under member 30 differs from the above-described first embodiment. Namely, the under member 30 relating to the third embodiment also has the inclined portion 32 that is formed along the entire transverse direction of the receiving portion 34.

The region that is the substantial half at the vehicle transverse direction inner side of this inclined portion 32 is made to be a thin plate portion 38 whose plate thickness is formed to be thinner (e.g., is made to be a plate thickness of 1 mm or less) than that of the other region. This is a structure in which the rigidity of the substantial half at the vehicle transverse direction inner side, except for the receiving portion 34, of the under member 30 is reduced. Note that, in this case as well, discontinuous slits or a groove portion (not illustrated) or the like, that serve as a breakage facilitating means, may be formed in the peak portion 32B at the region of the substantial half at the vehicle transverse direction inner side of the inclined portion 32.

In accordance with the under member 30 that has such a structure, when the vehicle is in an offset crash (or a small overlap crash), as the suspension members 20 move (move rearward) while rotating toward a vehicle body obliquely rear side in plan view, the rear side mounting portion 22 at the collision side crushes the substantial half at the vehicle transverse direction inner side of the inclined portion 32 of the under member 30 at the collision side, i.e., the thin plate portion 38. Due thereto, the thin plate portion 38 of the inclined portion 32 breaks and caves-in from the peak portion 32B, and the receiving surface 34A (the flat plate portion 33) of the receiving portion 34 is exposed.

Namely, the rear side mounting portion 22 at the collision side is made to abut (pressure-contact) the exposed receiving surface 34A, and movement of the suspension member 20 toward a vehicle body obliquely rear side in plan view is impeded by this receiving surface 34A. Accordingly, the collision load that is inputted to the suspension member 20 is transmitted from the rear side mounting portion 22 to the under member 30, and is transmitted from the under member 30 to the floor panel 18, and further to the front side member 12.

In this way, at the under member 30 relating to the third embodiment as well, the transmission path of the collision load that is inputted to the suspension member 20 can be ensured (a reduction in the load transmission path can be suppressed), and this collision load can be absorbed efficiently. Accordingly, deformation of the vehicle cabin 11 can be suppressed or prevented.

Note that the receiving surface 34A may be structured, without providing the flat plate portion 33, by the substantial half at the vehicle transverse direction inner side of the inclined portion 32 that is crushed, i.e., by a portion of the peak portion 32B side of thin plate portion 38. Further, when the vehicle is in a full overlap crash, operation is equivalent to that of the above-described first embodiment, and therefore, description thereof is omitted.

Fourth Embodiment

Lastly, the vehicle lower portion structure 10 relating to a fourth embodiment is described. Note that regions that are equivalent to those of the above-described first embodiment through third embodiment are denoted by the same reference numerals, and detailed description thereof (including common operation thereof) is omitted when appropriate.

Figure 8:
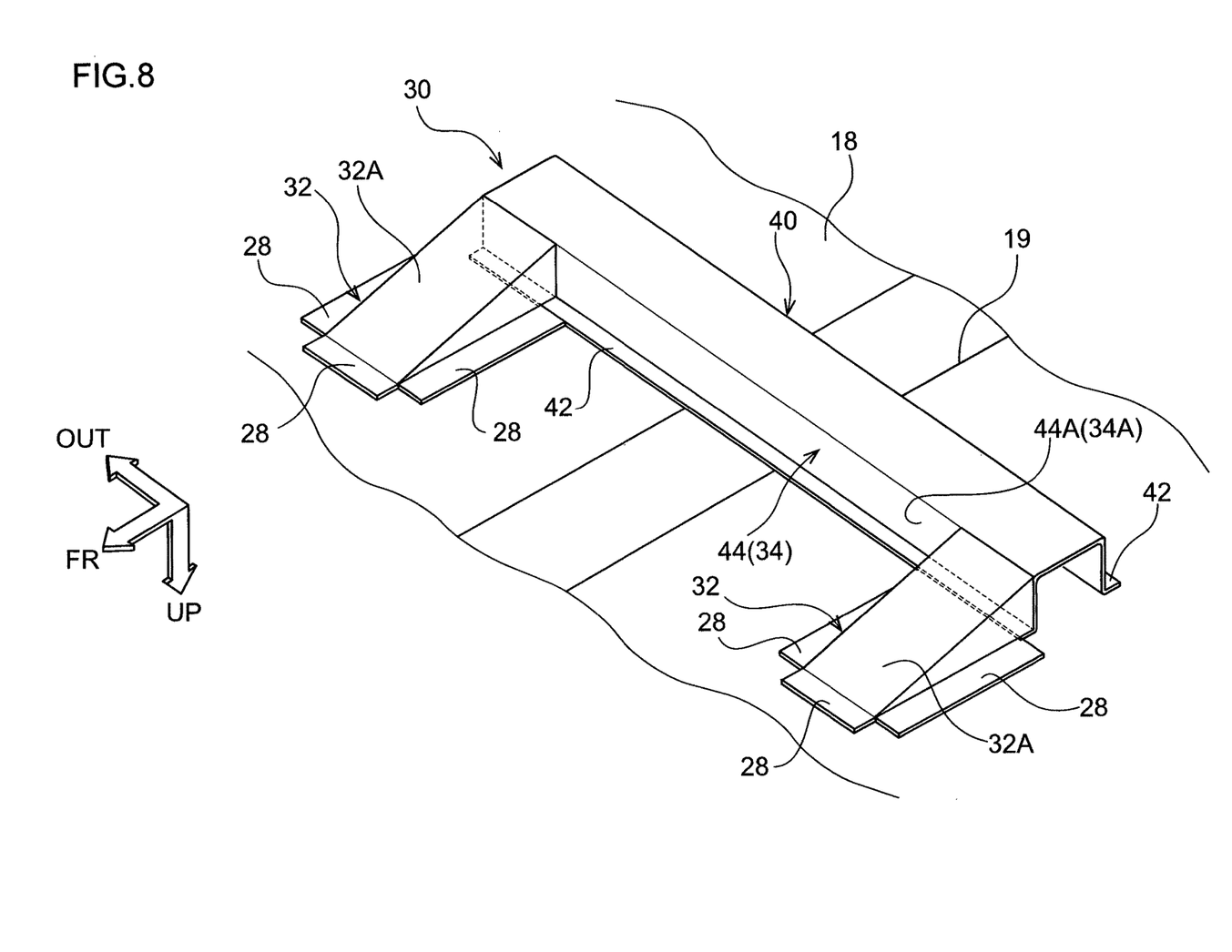
FIG. 8 is a perspective view showing an under member relating to a fourth embodiment.

As shown in FIG. 8, at the vehicle lower portion structure 10 of this fourth embodiment, a cross member 40 that extends in the vehicle transverse direction is mounted to the bottom surface of the floor panel 18 so as to span over a tunnel portion 19 that is formed along the vehicle body longitudinal direction at the vehicle transverse direction central portion of the floor panel 18.

In further detail, this cross member 40 is formed in a hat shape in cross-section. Due to flange portions 42, that jut-out respectively from the vehicle body front side and vehicle body rear side of the cross member 40, being joined to the bottom surface of the floor panel 18 by welding or the like, the cross member 40 structures closed cross-sectional structures at the portions other than the tunnel portion 19.

Further, the inclined portions 32, that are equivalent to that of the first embodiment, are joined by welding or an adhesive or the like to a front side wall 44, that faces the vehicle body front side, at the vehicle transverse direction both end portions of the cross member 40. Namely, the portion of the front side wall 44 of the cross member 40, which portion is further toward the vehicle transverse direction inner side than the inclined portions 32, is equivalent to the receiving portion 34, and a wall surface 44A of this front side wall 44 is equivalent to the receiving surface 34A.

In this way, in accordance with the under member 30 that is structured by the inclined portions 32 and the front side wall 44 (the receiving portion 34) of the cross member 40, when the vehicle is in an offset crash (or a small overlap crash), the suspension members 20 move (move rearward) while rotating toward a vehicle body obliquely rear side in plan view, and the rear side mounting portion 22 at the collision side is made to abut (pressure-contact) the wall surface 44A (the receiving surface 34A) at the front side wall 44 (the receiving portion 34) of the cross member 40.

Namely, movement, toward a vehicle body obliquely rear side as seen in plan view, of the suspension member 20 is impeded by the wall surface 44A (the receiving surface 34A) of the front side wall 44 (the receiving portion 34), and the collision load that is inputted to the suspension member 20 is transmitted from the rear side mounting portion 22 to the cross member 40, and is transmitted from the cross member 40 to the floor panel 18, and further to the front side member 12.

In this way, at the under member 30 relating to the fourth embodiment as well, the transmission path of the collision load that is inputted to the suspension member 20 can be ensured (a reduction in the load transmission path can be suppressed), and this collision load can be absorbed efficiently. Accordingly, deformation of the vehicle cabin 11 can be suppressed or prevented. Note that, when the vehicle is in a full overlap crash, operation is equivalent to that of the above-described first embodiment, and therefore, description thereof is omitted.

Further, the cross member 40 that structures the under member 30 relating to the fourth embodiment extends in the vehicle transverse direction so as to span over the tunnel portion 19, and is joined to the bottom surface of the floor panel 18. Therefore, the rigidity (strength) of the vehicle body can be improved. Accordingly, in the case of the under member 30 relating to the fourth embodiment, there is also the advantage that the steering stability of the vehicle can be improved.

The vehicle lower portion structures 10 relating to the present embodiments have been described above on the basis of the drawings, but the vehicle lower portion structures 10 relating to the present embodiments are not limited to the illustrated structures, and the designs thereof can be changed appropriately within a scope that does deviate from the gist of the present invention. For example, the rear side mounting portion 22 of the suspension member 20 is not limited to the structure of being supported at the front side member 12 via the rear side mounted-to portion 16.

Further, the under member 30 is not limited to the structure of being mounted to the floor panel 18 that serves as a vehicle body structural member, and, for example, in the same way as the rear side mounted-to portion 16, may be structured so as to be mounted to the inner side wall 12A, that faces the vehicle transverse direction inner side, of the front side member 12. Namely, in this case, the front side member 12 is the vehicle body structural member.

Further, the receiving portions 34 of the under members 30 relating to the first through third embodiments are columnar shapes whose side walls, that face in the vehicle transverse direction, are substantially fan-shaped. However, the receiving portions 34 are not limited to this, and, for example, may be formed in columnar shapes whose side walls that face in the vehicle transverse direction are right isosceles triangular or are square (neither of which is illustrated).

Moreover, the lengths, in the vehicle transverse direction, of the flat plate portions 33 of the under members 30 relating to the first through third embodiments may be formed to lengths that structure only the receiving surface 34A. Namely, the length, in the vehicle transverse direction, of the flat plate portion 33 may be made to be substantially half, and this flat plate portion 33 may be structured so as to not support the peak portion 32B of the inclined portion 32 that is disposed at the vehicle body front side and the vehicle transverse direction outer side of the receiving portion 34.

The disclosure of Japanese Patent Application No. 2013-129929 is, in its entirety, incorporated by reference into the present Description. All publications, patent applications, and technical standards mentioned in the present Description are incorporated by reference into the present Description to the same extent as if such individual publication, patent application, or technical standard was specifically and individually indicated to be incorporated by reference.

The invention claimed is:

1. A vehicle lower portion structure, comprising:
a suspension member that is disposed at a lower portion of a space portion at a vehicle body front side of a vehicle cabin;
an inclined portion that is provided at a first vehicle body structural member that is further toward a vehicle body rear side than a rear portion of the suspension member, and that has an inclined face that, when the suspension member moves toward the vehicle body rear side, guides the suspension member toward a vehicle body lower rear side; and
a receiving portion that is provided at a second vehicle body structural member that is further toward the vehicle body rear side than the rear portion of the suspension member, and that has a receiving face that, when the suspension member moves toward a vehicle body obliquely rear side as seen in plan view, receives the suspension member,
wherein the receiving face is formed further toward a vehicle transverse direction inner side than the inclined portion,
wherein the receiving face and the inclined portion do not overlap as viewed in a vehicle front-rear direction,
wherein a front edge of the inclined face is disposed further toward the vehicle body front side than the receiving face, and
wherein an angle of inclination of the receiving face with respect to a horizontal direction is larger than an angle of inclination of the inclined face with respect to the horizontal direction.

2. The vehicle lower portion structure of claim 1, wherein the receiving face is formed as a result of a portion of the inclined portion being crushed in conjunction with movement of the suspension member toward the vehicle body obliquely rear side as seen in plan view.

3. The vehicle lower portion structure of claim 1, wherein the receiving portion extends in a vehicle transverse direction so as to span a tunnel portion formed at a floor panel.

4. The vehicle lower portion structure of claim 1, wherein the first vehicle body structural member and the second vehicle body structural member are the same member.

5. The vehicle lower portion structure of claim 4, wherein the inclined portion and the receiving portion are molded integrally.

6. The vehicle lower portion structure of claim 1,
wherein an inner side wall of the inclined portion is integrally continuous with the receiving surface so as to form a substantial right angle with the receiving surface as seen in a bottom view.

7. A vehicle lower portion structure, comprising:
a suspension member that is disposed at a lower portion of a space portion at a vehicle body front side of a vehicle cabin;
an inclined portion that is provided at a first vehicle body structural member that is further toward a vehicle body rear side than a rear portion of the suspension member, and that has an inclined face that, when the suspension member moves toward the vehicle body rear side, guides the suspension member toward a vehicle body lower rear side; and
a receiving portion that is provided at a second vehicle body structural member that is further toward the vehicle body rear side than the rear portion of the suspension member, and that has a receiving face that, when the suspension member moves toward a vehicle body obliquely rear side as seen in plan view, receives the suspension member,
wherein the receiving face is disposed further toward a vehicle rear side than a front edge of the inclined portion,
wherein the receiving face and the inclined portion do not overlap as viewed in a vehicle front-rear direction, and wherein an angle of inclination of the receiving face with respect to a horizontal direction is larger than an angle of inclination of the inclined face with respect to the horizontal direction.

8. The vehicle lower portion structure of claim 7, wherein an inner side wall of the inclined portion is integrally continuous with the receiving surface so as to form a substantial right angle with the receiving surface as seen in a bottom view.

\* \* \* \* \*